United States Patent [19]
Gray

[11] Patent Number: 4,993,145
[45] Date of Patent: Feb. 19, 1991

[54] APPARATUS FOR GRIPPING TUBES IN MULTIROW PLATE FIN COILS

[75] Inventor: Kenneth P. Gray, Syracuse, N.Y.

[73] Assignee: Carrier Corporation, Syracuse, N.Y.

[21] Appl. No.: 944,485

[22] Filed: Dec. 22, 1986

[51] Int. Cl.[5] .......... B23P 15/26
[52] U.S. Cl. .......... 29/726; 29/244; 29/255
[58] Field of Search .......... 29/726, 235, 255, 283, 29/281.1, 264, 244; 269/152, 153

[56] References Cited

U.S. PATENT DOCUMENTS

| | | | |
|---|---|---|---|
| 559,803 | 5/1896 | Johnson | 29/244 |
| 1,459,131 | 6/1923 | Alexander | 29/244 |
| 1,666,847 | 4/1928 | Cote | 29/244 |
| 1,838,738 | 12/1931 | Bradley | 29/244 |
| 1,856,621 | 5/1932 | Coffey | 29/244 |
| 3,594,890 | 7/1971 | Cordell et al. | 29/255 |
| 3,787,950 | 1/1974 | Bagby | 29/255 |
| 3,791,011 | 2/1974 | Keys | 29/726 |
| 3,925,874 | 12/1975 | Moyers | 29/283 |
| 4,627,155 | 12/1986 | Maneabelli | 29/283 |
| 4,643,409 | 2/1987 | Hamatani | 269/152 |

FOREIGN PATENT DOCUMENTS

| | | | |
|---|---|---|---|
| 2231916 | 12/1974 | France | 29/244 |

*Primary Examiner*—Howard N. Goldberg
*Assistant Examiner*—I. Cyda
*Attorney, Agent, or Firm*—Robert H. Kelly

[57] ABSTRACT

An apparatus for gripping a tube end of a plate fin heat exchanger by a pair of coacting jaw grippers movable both longitudinally and radially with respect to the tube end. The coacting jaw grippers are positioned such that the tube ends of a multirow coil can be gripped along any row of the coil.

3 Claims, 4 Drawing Sheets

APPARATUS FOR GRIPPING TUBES IN MULTIROW PLATE FIN COILS

BACKGROUND OF THE INVENTION

This invention relates generally to heat exchanger coils and, more particularly, to a method and apparatus for gripping multirow coils during tension expanding and then belling of plate fin heat exchanger coils.

A plate fin heat exchanger coil is commonly constructed with a plurality of flat, parallel plates having laterally spaced holes therein for receiving refrigerant tubes, or hairpin tubes, therein. At each end of the plate fin bundle there is a tube sheet composed of heavier material, and adjacent one of the tube sheets, the open ends of the hairpin tubes are fluidly connected by way of U-shaped return bends that are secured thereto by way of soldering, or brazing, or the like. When the coils are installed into a refrigeration system, the refrigerant is made to flow through the hairpin tubes, and the air to be cooled or heated is made to flow over the plate fins, such that a heat transfer is thereby affected.

As is known, the tube compression expansion process is generally carried out by passing tube expanding rods through the open ends of the hairpin tubes and then belling the tube. A backing plate is placed against the tube bends during compressive expansion to prevent the tubes from being driven out of the unit as the expanding tools are forced therethrough. As a result of this holding action the tubes are compressed rearwardly as they are being expanded outwardly by the tools. This in turn, causes the tubes to shrink so that the axial length of each tube can vary dramatically in final assembly. Because of the differences in tube length, belling of the tubes is difficult and generally results in uneven or misaligned bells being formed in the tube ends. The return bend therefore cannot be properly seated within the bells leading to the formation of relatively weak or incomplete solder or braze joints in this critical region.

In order to better facilitate the formation of the tube bells and the joining of the return bends therein, it has been the common practice in the art to bring the open ends of the hairpins a considerable distance out from the adjacent tube sheet. The additional length of tube allows each bell to be brought to full depth without interference from the tube sheet. The unsupported length of tube between the bell and the tube sheet, however, represents the weakest section in the unit. Hydrostatic tests have shown that the flow circuit will generally rupture in this region when exposed to high internal stresses. Beyond weakening the unit the added length of tubing wastes costly material and thus raises the cost of each unit. Furthermore, the added tube length makes it difficult to compact the unit which in the case of a room air conditioner is of primary importance.

In order to improve the hydrostatic burst strength of a plate fin heat exchanger, a technique for tension expanding hairpin tubes into a fin pack unit, as explained in greater detail in U.S. Pat. No. 4,584,765 was developed. This prior technique was generally carried out on coils which were first belled by a split collet and pin arrangement, and then expanded. Because of the closeness of the heat exchanger tube rows the bells that were formed are simple, single diameter bells, to which pretinned return bends are used. Further, because of the closeness of the heat exchanger tube rows, the jaw members of the tube clamping fixture were relatively long, thin members. In operation, however, these long, thin jaw members bowed or bent during the expansion process. Furthermore, the single diameter bell was not suitable for ultrasonic soldering, but had to use pretinned return bends. Thus, to use ultrasonic soldering, the bell diameter would have had to be increased, which would have required even less space between adjacent tubes, making the jaw member even thinner and subject to more bowing in the horizontal direction.

A disadvantage of the prior tension expansion progress is that the outer Jaw members of the tube clamping fixture must be massive to prevent bending, and thus in multirow coils there is not enough room for the jaw members to fit between rows.

Thus, there is a clear need for a gripper system that can be used during the tension expansion process of multirow coils wherein the coils can be gripped and expanded one or two rows at a time.

SUMMARY OF THE INVENTION

It is an object of the present invention to improve the apparatus for manufacturing multirow plate fin heat exchangers.

It is another object of the present invention to simplify the gripping apparatus for the manufacture of multirow plate fin heat exchangers.

It is a further object of the present invention to improve the gripping apparatus for tension expanders for multirow plate fin heat exchangers.

It is still another object of the present invention to provide a single row gripper apparatus for gripping an entire row of a multirow plate fin heat exchanger during tension expansion of the entire row.

It is still a further object of the present invention to provide a two row gripper apparatus for gripping two entire rows of a multirow plate fin heat exchanger during tension expansion of the two entire rows.

These and other objects of the present invention are attained by a gripper apparatus for gripping one row of a multirow coil during tension expansion. The gripper apparatus includes a plurality of pairs of finger-like gripper blocks, each finger-like gripper block of a pair is mounted to a massive support bar located outside the tube end plane, wherein the pairs of finger-like gripper blocks move longitudinally along the tube and are positioned between adjacent tubes for gripping an entire row of tubes of a multirow coil.

A two row gripper apparatus is further disclosed for gripping two rows of a multirow coil during tension expansion of two rows at a time. The two row gripper apparatus includes a pair of opposed support bar members having a plurality of jaw members arranged to move longitudinally along the tubes and to close over the ends of the tubes contained in two adjacent rows of a multirow plate fin coil.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

Other objects and advantages of the present invention will be apparent from the following detailed description in conjunction with the accompanying drawings, forming a part of this specification, and in which reference numerals shown in the drawings designate like or corresponding parts throughout the same, and in which.

DESCRIPTION OF THE PREFERRED EMBODIMENT

Figure 1:
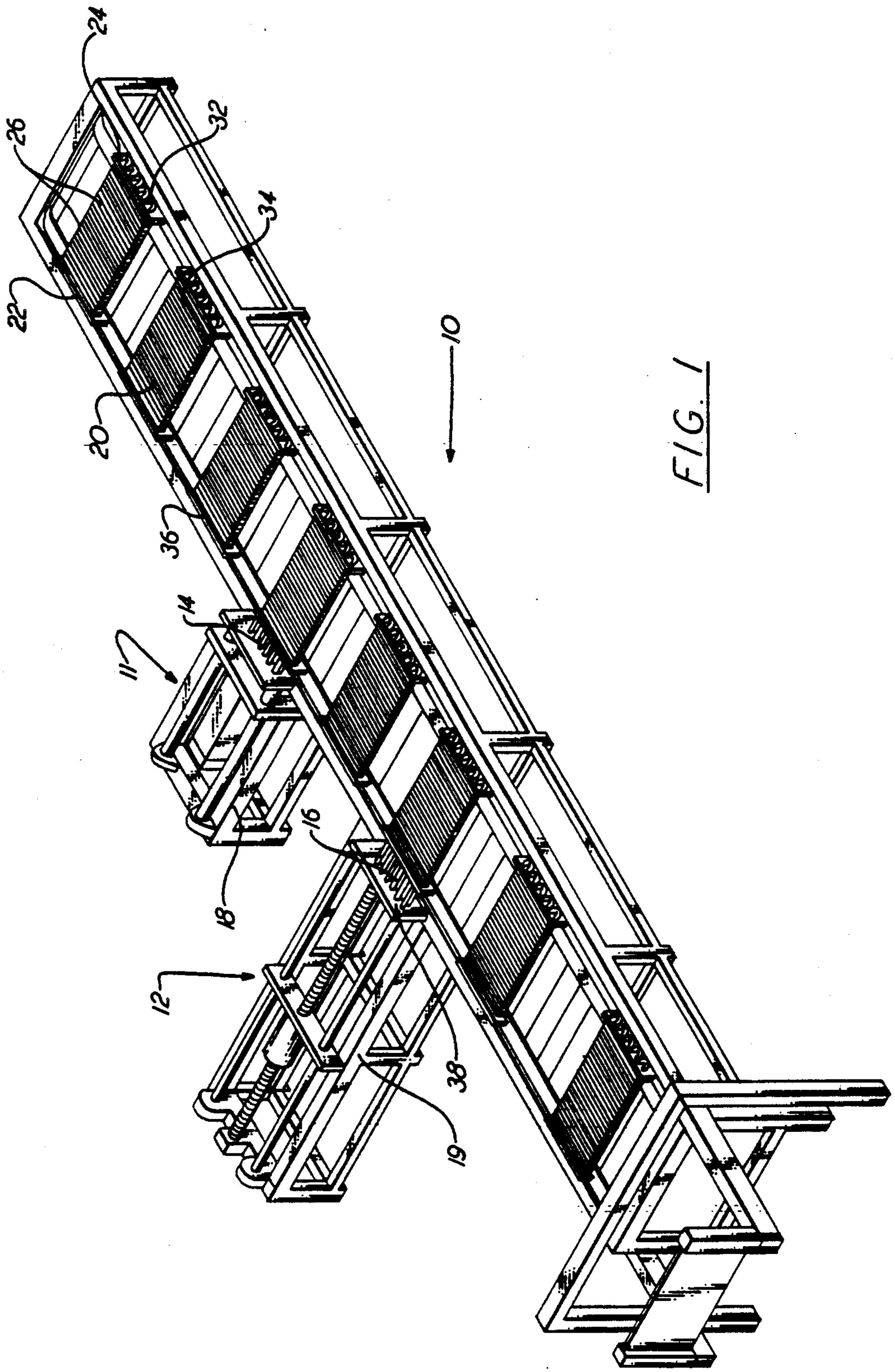
FIG. 1 is a perspective view of a portion of a multi-row plate fin coil assembly apparatus including belling and expanding stations embodying the teachings of the present invention.
Figure 2:
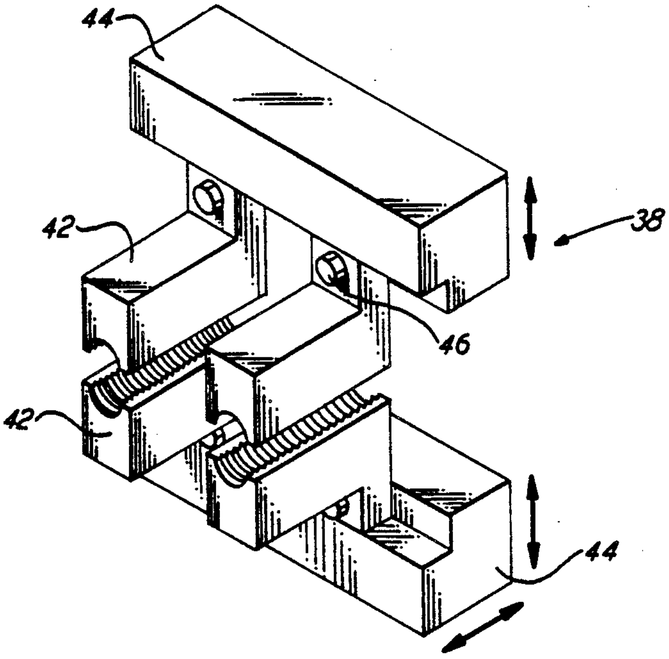
FIG. 2 is a perspective view of a plurality of pairs of gripper blocks of the present invention.

Referring to FIG. 1, there is shown a portion of a plate fin heat exchanger assembly system 10 with the various components used in accordance with the method and apparatus of the present invention. The present plate fin coil manufacturing apparatus is described in connection with beller station 11 and expander station 12. Prior to arriving at the beller station 11, the plate fin heat exchanger 20 is partially assembled at a lacing station (not shown). Generally, the plate fin heat exchanger 20 has a plurality of fins 26, a bottom tube sheet 24, and a top tube sheet 22. Hairpin tubes 28 are arranged having a return portion 32 and leg portions 34 such that the leg portions extend through the entire fin bundle and tube sheets 22, 24 and then extend beyond tube sheet 22 defining extension portions 36. The hairpin tubes are physically inserted or laced through arranged openings in the fins and tube sheets into the positions as shown.

The tube belling station 11 includes a plurality of hydraulically operated beller tools 14 that are mounted on a beller support platform 18. The platform functions to index the plate fin heat exchange within the beller station so that the open ends of the hairpin tubes are in axial alignment with the beller tools 14. In this particular embodiment, the plate fin heat exchangers are multi-row coils having close tolerances between adjacent belled tube ends. Further, the beller station 11 may use any well known apparatus to make the necessary bell having a complex geometry, commonly referred to in the trade as an "ALCOA" bell generally in aluminum or a uniform flared bell generally in copper, permits solder to flow into the joint region when soldering the completed plate fin heat exchanger or permits the capture of braze material when a braze ring melts, respectively.

In addition, the expander station 12 includes a plurality of hydraulically operated bullet rods 16 mounted on support platform 19. Similar to the beller station 11, the bullet support platform functions to index the belled plate fin heat exchanger 20 within the expander station 12 so that the tubes may be expanded into the fins and tube sheets as described further hereinafter. Further, at the expander station 12 the belled ends of the hairpin tubes are gripped by bell clamp 38 during the tension expansion process.

Turning now to FIGS. 2-6 there is shown an embodiment of the bell clamp 38 having a plurality of pairs of finger-like blocks 42—42 supported on movable bars 44—44. The bars 44—44 are located outside the plane of the tube ends, thus only the finger-like blocks 42 can project between adjacent belled tubes. Although not shown, the support bars 44 are capable of being moved both vertically and longitudinally in the direction of the arrows, thus the finger-like blocks 42 can move longitudinally into and out of engagement with the belled portion 37 of the leg portion 34 of the hairpin tube 28. The finger-like blocks 42 are secured to the support bars 44 by fastener means 46, for example machine screws.

Figure 3:
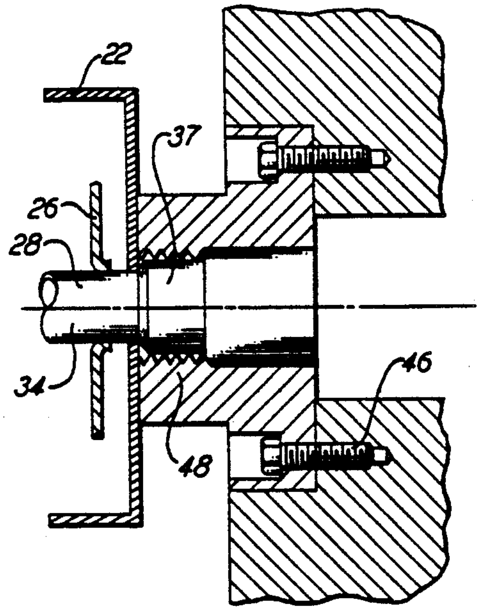
FIG. 3 is a sectional elevation view of one embodiment of the gripper block of the present invention.
Figure 4:
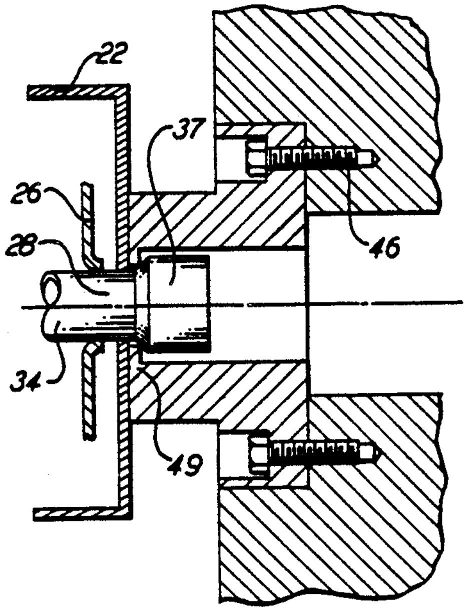
FIG. 4 is a sectional elevation view of another embodiment of the gripper block of the present invention.

The finger-like blocks 42 as shown in FIG. 3 includes gripper means 48, for example serrated teeth, which form a slight interference fit on the bell portion 37 of the hairpin tube 28 to give a positive clamp force. Moreover, as shown in FIG. 4, the finger-like blocks 42 include a retainer clamp portion 49 which are used to hold the belled portion 37 of the hairpin tube on its small diameter in order to retain the hairpin tube during the tension expansion process.

Figure 6:
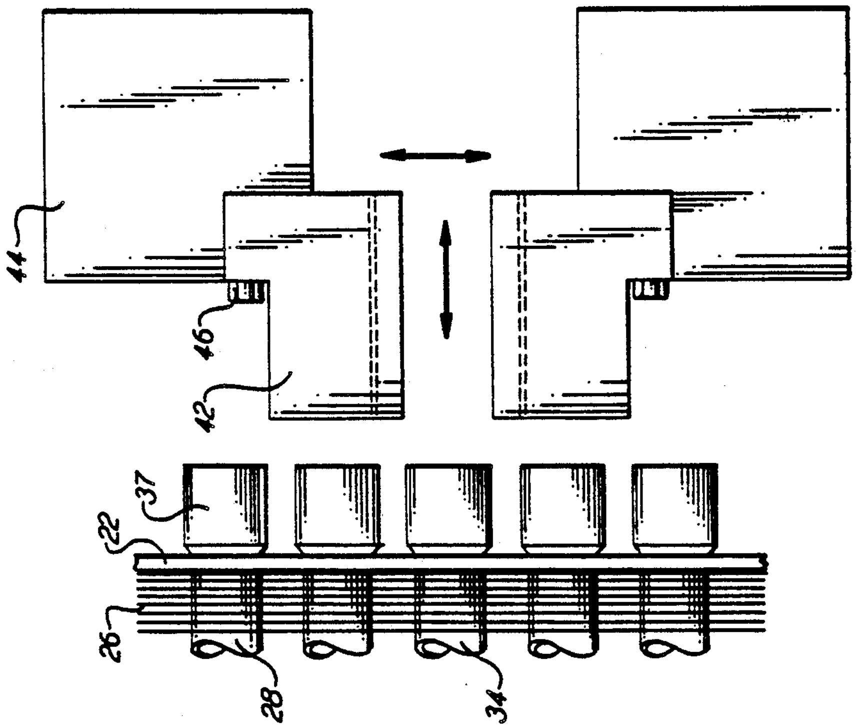
FIG. 6 is a section taken along line VI-VI of FIG. 5.
Figure 5:
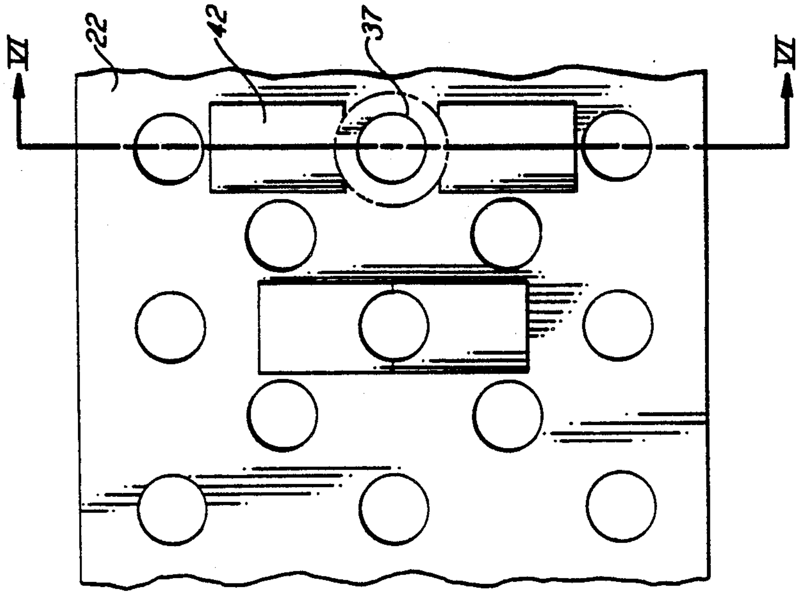
FIG. 5 is a partial rear view of the gripper block of the present invention.

As illustrated in FIGS. 5 and 6 the pairs of finger-like blocks 42 are positioned to move longitudinally against the top tube sheet 22 so that each belled portion 37 of the tubes in a single row are gripped in order that the entire row can be expanded at one time.

Figure 7:
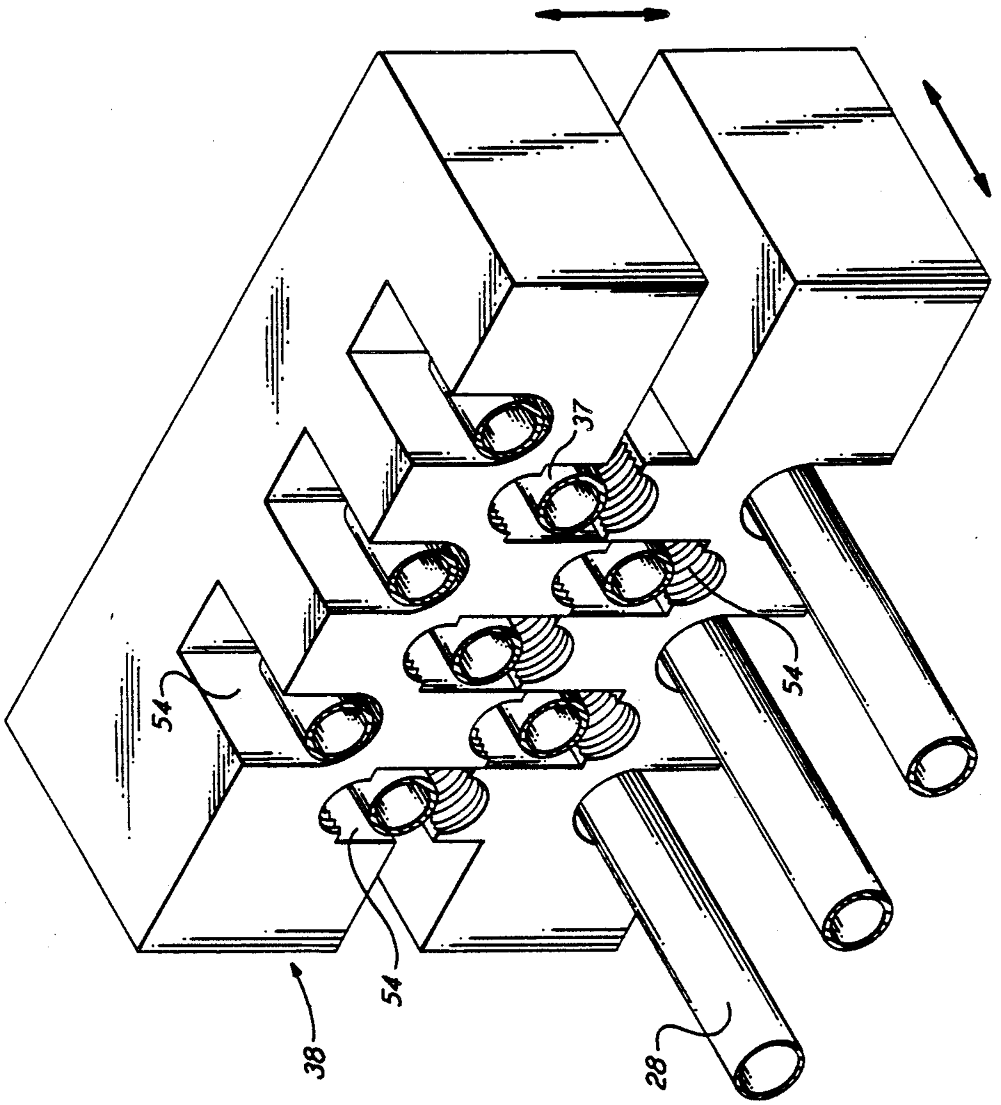
FIG. 7 is a perspective view of a two row gripper of the present invention.

In accordance with another embodiment of the present invention as shown in FIG. 7, the bell clamp 38 includes a pair of jaw members 52 having a plurality of cutout portions 54 adapted to move in the direction of the arrows as shown. The jaw members 52 are opened and closed, and move in the longitudinal direction by means of a known hydraulic system. The jaw members 52 are illustrated in the fully open position wherein the belled portion 37 of the hairpin tubes 28 extend into the cutout portion 54. Adjacent jaw members are arranged in staggered rows. The jaw members 52 are adapted to grip two rows of prebelled coils at a time in order that the two rows may be expanded in tension expansion at the same time.

While a preferred embodiment of the present invention has been depicted and described, it will be appreciated by those skilled in the art that many modifications, substitutions and changes may be made thereto without departing from the true spirit and scope of the invention. For example, although the invention has been described in terms of gripping a belled tube, it may also grip a non-belled tube.

What is claimed is:

1. An apparatus for gripping a prebelled tube end of a tube extending a predetermined distance beyond a tube sheet of a plate fin heat exchanger having a plurality of apertured plate fins parallelly spaced between two apertured tube sheets and a plurality of hairpin tubes extending through the apertures for expanding the heat exchanger comprising:

a clamping fixture having a pair of movable support means, said support means movable both longitudinally along an axis of the tubes toward the tube ends of the tubes and radially toward the axis of the tubes said support means positioned outside a plane of the tube ends; and coacting rigid jaw pairs fixedly mounted on said pair of movable support means, said rigid jaw pairs arranged to longitudinally move through the plane of the tube ends and along the tube extending a predetermined distance beyond the tube sheet and arranged to open and close radially with the movement of said movable support means about the extending tube.

2. An apparatus as set forth in claim 1 wherein said coacting jaw pairs further includes a pair of finger-like grippers that move longitudinally along the tube end into contact with a proximate tube sheet.

3. An apparatus as set for in claim 1 wherein said coacting jaw pairs are an integral portion of said clamping fixture and adjacent jaw pairs are arranged in staggered positions whereby two rows of a multirow coil are gripped simultaneously.

* * * * *